(12) United States Patent
Hanson et al.

(10) Patent No.: US 7,484,758 B2
(45) Date of Patent: Feb. 3, 2009

(54) HIP RESTRAINTS

(75) Inventors: Donald S. Hanson, Evans, GA (US); Bradley J. Hanson, North Augusta, SC (US); Kent H. Bruntz, Evans, GA (US)

(73) Assignee: Textron Inc., Providence, RI (US)

( * ) Notice: Subject to any disclaimer, the term of this patent is extended or adjusted under 35 U.S.C. 154(b) by 233 days.

(21) Appl. No.: 11/277,692

(22) Filed: Mar. 28, 2006

(65) Prior Publication Data

US 2007/0228711 A1 Oct. 4, 2007

(51) Int. Cl.
*B60R 21/02* (2006.01)

(52) U.S. Cl. ..................... 280/748

(58) Field of Classification Search .......... 280/748, 280/DIG. 8, DIG. 5; 297/411.27, 466, 646, 297/464

See application file for complete search history.

(56) References Cited

U.S. PATENT DOCUMENTS

| | | | |
|---|---|---|---|
| 5,478,137 A | 12/1995 | Olson et al. | |
| 5,556,441 A | 9/1996 | Courtwright et al. | |
| D442,402 S | 5/2001 | Maypole | |
| 6,371,560 B1 | 4/2002 | Fulford et al. | |
| 6,582,004 B1 * | 6/2003 | Hamm | 296/65.08 |
| D498,704 S | 11/2004 | Bonner et al. | |
| 7,240,948 B1 * | 7/2007 | Houston | 296/63 |
| 2003/0209918 A1 | 11/2003 | Cheek et al. | |
| 2005/0264048 A1 | 12/2005 | Collins | |

FOREIGN PATENT DOCUMENTS

| | | |
|---|---|---|
| JP | 5185954 A | 7/1993 |
| JP | 2001122169 A | 5/2001 |
| JP | 2007061375 A | 3/2007 |
| WO | 2004/067360 | 8/2004 |

* cited by examiner

*Primary Examiner*—John Q. Nguyen
*Assistant Examiner*—Robert A. Coker
(74) *Attorney, Agent, or Firm*—Harness, Dickey & Pierce, P.L.C.

(57) ABSTRACT

A golf car including a seat assembly and a first hip restraint. The seat assembly has an upper surface, a lower surface opposite the upper surface, a front end, a rear end opposite the front end, a first side, and a second side opposite the first side. The first hip restraint is mounted to the lower surface and extends to the first side. The first hip restraint includes polypropylene. The first hip restraint is gas assist injection molded.

16 Claims, 12 Drawing Sheets

Fig-9

HIP RESTRAINTS

FIELD

The present disclosure relates to a method and apparatus for a golf car.

BACKGROUND

The statements in this section merely provide background information related to the present disclosure and may not constitute prior art.

A golf car can include a driver side hip restraint and a passenger side hip restraint to provide support for a driver and a passenger of the golf car respectively. The hip restraints can be mounted at opposite sides of the golf car's front seat assembly. While current hip restraints are suitable for their intended uses, they are subject to improvement. For example, current hip restraints often make it difficult for a driver and/or passenger to easily ingress and egress the golf cart.

SUMMARY

The present teachings can provide for a golf car including a seat assembly and a first hip restraint. The seat assembly has an upper surface, a lower surface opposite the upper surface, a front end, a rear end opposite the front end, a first side, and a second side opposite the first side. The first hip restraint is mounted to the lower surface and extends to the first side. The first hip restraint includes polypropylene. The first hip restraint is gas assist injection molded.

The present teachings can also provide for a hip restraint for a golf car. The hip restraint includes a base portion; a post extending from the base portion; an arched portion extending between the base portion and the post; an aperture defined by the base portion, the post, and the arched portion; and a flange extending from the post.

The present teachings can further provide for a golf car including a seat base assembly, a first hip restraint, a second hip restraint, a first flange, and a second flange. The seat base assembly has an upper surface, a lower surface opposite the upper surface, a front end, a rear end opposite the front end, a first side between the front end and the rear end, and a second side between the front end and the rear end. The first hip restraint is mounted at the first side. The second hip restraint is mounted at the second side. The first flange extends from the first hip restraint and overlaps the upper surface of the seat base. The second flange extends from the second hip restraint and overlaps the upper surface of the seat base.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 7b is a second perspective view of the hip restraint of FIG. 7a;

FIG. 7c is a top view of the driver's side hip restraint of FIG. 7a;

FIG. 7d is a bottom view of the driver's side hip restraint of FIG. 7a;

FIG. 7e is an inner side view of the hip restraint of FIG. 7a;

FIG. 7f is an outer side view of the hip restraint of FIG. 7a;

FIG. 8a is a first perspective view of the passenger's side hip restraint of the golf car of FIG. 1;

FIG. 8b is a second perspective view of the hip restraint of FIG. 8a;

FIG. 8c is a top view of the hip restraint of FIG. 8a;

FIG. 8d is a bottom view of the hip restraint of FIG. 8a;

FIG. 8e is an outer side view of the hip restraint of FIG. 8a;

FIG. 8f is an inner side view of the hip restraint of FIG. 8a; and

DETAILED DESCRIPTION

The following description is merely exemplary in nature and is in no way intended to limit the present disclosure, application, or uses. Throughout this specification, like reference numerals will be used to refer to like elements.

Figure 1:
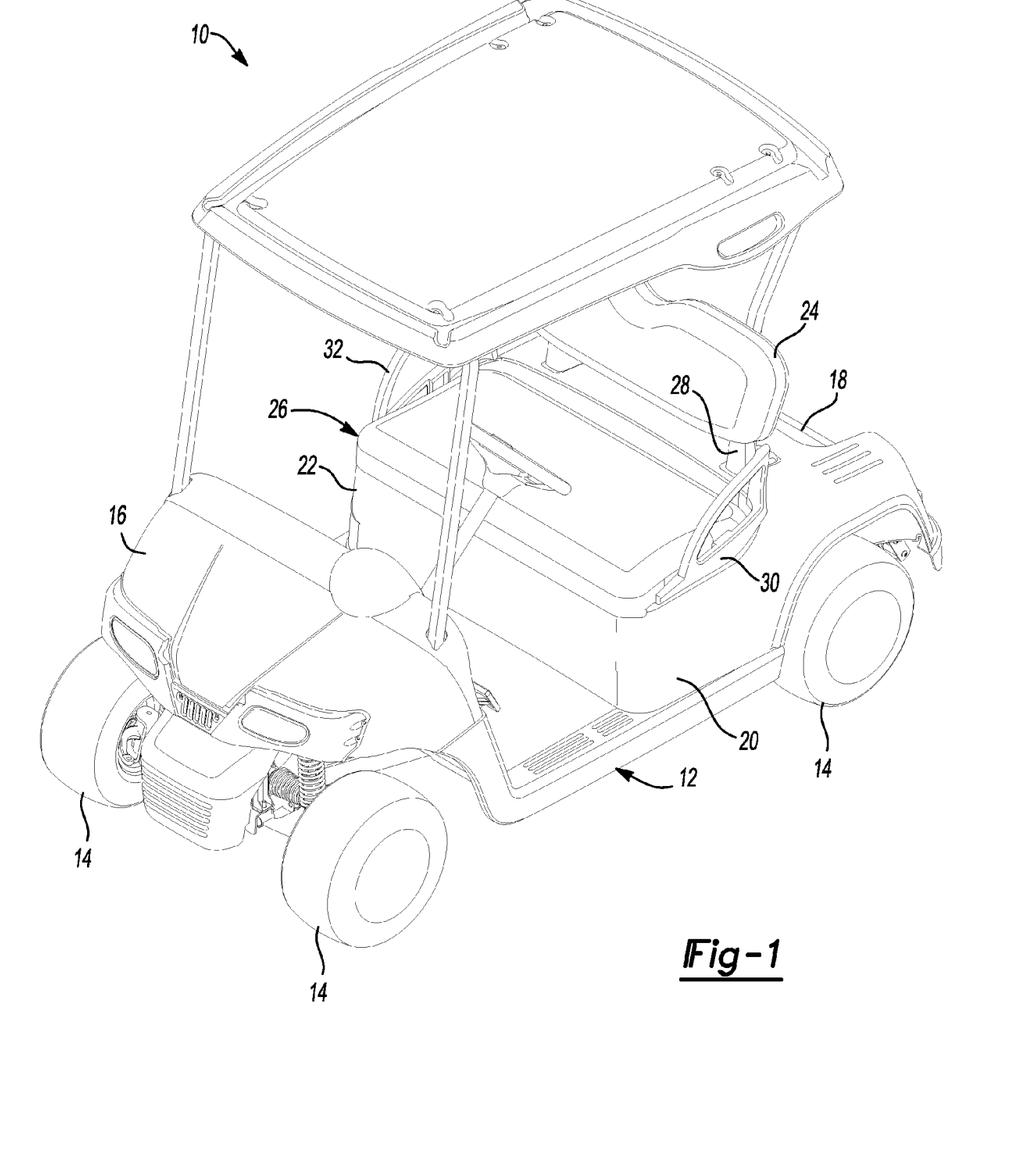
FIG. 1 is a driver's side perspective view of a golf car having hip restraints according to the present teachings.
Figure 2:
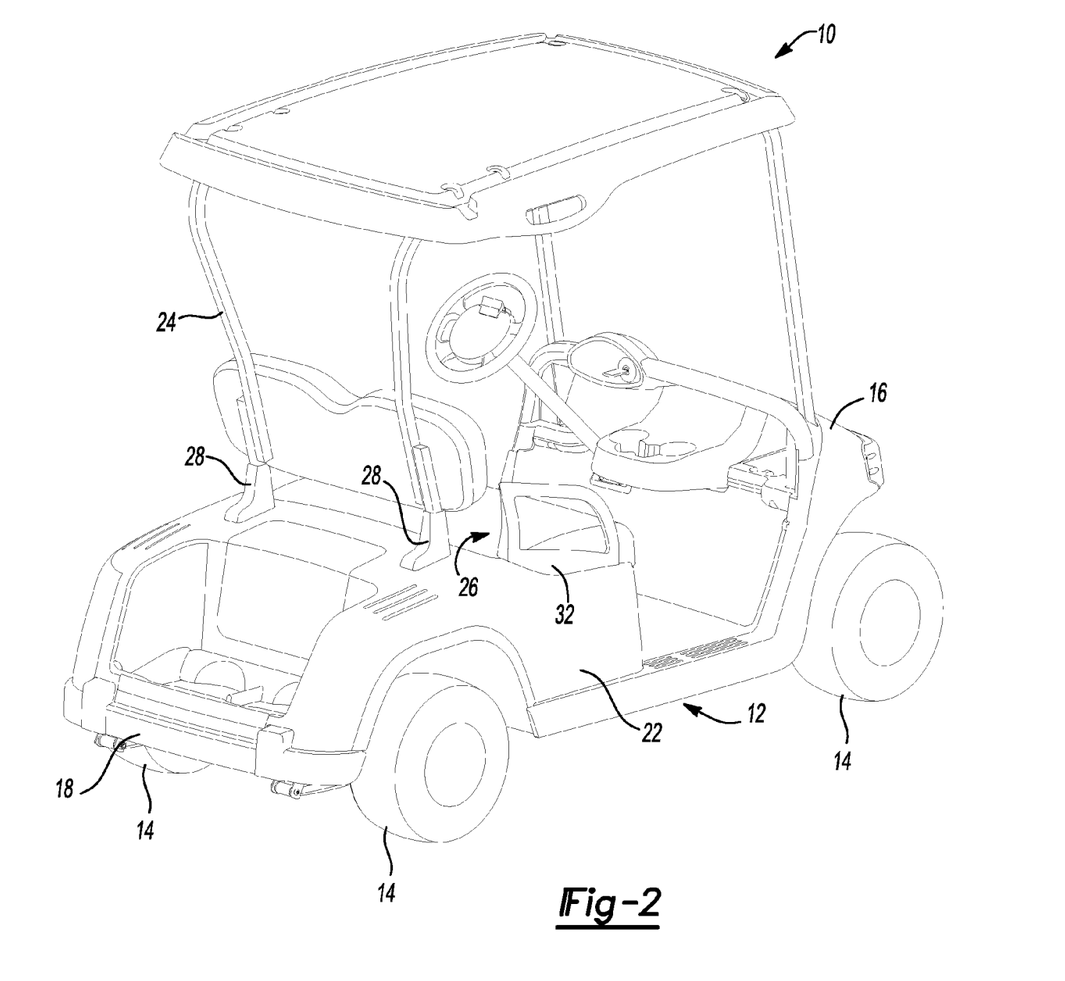
FIG. 2 is a passenger's side perspective view of the golf car of FIG. 1.

With initial reference to FIGS. 1 and 2, a utility vehicle according to the present teachings, which can be a golf car, is illustrated at reference numeral 10. The golf car 10 can include a body 12 supported by a plurality of wheels 14. The golf car body 12 can include a front end 16, a rear end 18, a driver side 20, and a passenger side 22. The golf car 10 can further include a seat back 24 and a seat base assembly 26. The seat back 24 can include a padded surface to provide back support to occupants of the car 10. The seat back 23 can be mounted to the body 12 by one or more supports 28.

With additional reference to FIGS. 3-6, the seat base assembly 26 can include a driver side hip restraint 30, a passenger side hip restraint 32, a seat bottom 34, and a seat cushion 36. With additional reference to FIG. 7, the driver side hip restraint 30 can include a base portion 38, an arched portion 40, a post 42, a first mounting flange 44a, and a second mounting flange 44b. The base portion 38 can include a front end 46 and a rear end 48. The base portion 38 can be generally angled relative to the mounting flanges 44a and 44b such that the front end 46 can be lower and closer to the mounting flanges 44a and 44b than the rear end 48.

The post 42 can extend from the rear end 48 of the base portion 38. The post 42 can include a flange 50 that can extend from the post 42 at about 90° relative to the base portion 38. The flange 50 can protrude a greater distance from the post 42 at the portion of the post 42 proximate the base portion 38 than at a portion of the post 42 distal to the base portion 38. The arched portion 40 can extend from the base 38, at a point offset from the front end 46, to the post 42. The arched portion 40 can be generally curved from the base 38 to the post 42. The arched portion 40 can define an aperture 52 between the base portion 38, the arched portion 40, and the post 42.

The flanges 44a and 44b can extend from the base portion 38 at about 90° relative to the base portion 38 and the arched portion 40. The flanges 44a and 44b can be at least substantially identical and can each include an upper surface 54a and 54b respectively and a lower surface 56a and 56b respectively opposite the upper surfaces 54a and 54b. The upper surfaces 54a and 54b can be substantially planar so as to, for example, prevent water from accumulating on the upper surfaces 54a and 54b. The flanges 44a and 44b can each further include through holes 58a and 58b respectively that can extend between the upper surfaces 54a and 54b and the lower surfaces 56a and 56b. The through holes 58a and 58b can be suitably sized to receive a fastening device.

With additional reference to FIG. 8, the passenger side hip restraint 32 can include a base portion 60, an arched portion 62, a post 64, a first mounting flange 66a, and a second mounting flange 66b. The base portion 60 can include a front end 68 and a rear end 70. The base portion 60 can be generally angled relative to the mounting flanges 66a and 66b such that the front end 68 can be lower than, and closer to the mounting flanges 66a and 66b, than the rear end 70. The post 64 can extend from the rear end 70 of the base portion 60. The post 64 can include a flange 72 that can extend from the post 64 at about 90° relative to the base portion 60. The flange 72 can protrude a greater distance from the post 64 at a portion of the post 64 proximate the base portion 60 than at a portion of the post 64 distal to the base portion 60.

The arched portion 62 can extend from the front end 68 of the base portion 60 to the post 64. The arched portion 62 can include a curved portion 74 and an at least generally straight portion 76. The curved portion 74 can extend from the front end 68 to the straight portion 76. The arched portion 62 transitions from the curved portion 74 to the straight portion 76 at a transition point between the front end 68 and the rear end 70. The transition point can be closer to the front end 68 than to the rear end 70. The straight portion 76 can extend from the curved portion 74 to the post 64 at an angle. The base portion 60, the arched portion 62, and the post 64 can together define an aperture 78.

The flanges 66a and 66b can extend from the base portion 60 at about a 90° angle to the base portion 60 and the arched portion 62. The flanges 66a and 66b can be at least substantially identical and can include an upper surface 80a and 80b respectively and a lower surface 82a and 82b respectively opposite the upper surfaces 80a and 80b. The upper surfaces 80a and 80b can be substantially planar so as to, for example, prevent water from accumulating on the upper surfaces 80a and 80b. The flanges 66a and 66b can each further include through holes 84a and 84b that can extend between the respective upper surfaces 80a and 80b and the respective lower surfaces 82a and 82b. The through holes 84a and 84b can be of any suitable size or shape to receive a suitable fastening device.

The driver side hip restraint 30 and the passenger side hip restraint 32 can be made of the same material. For example, the hip restraints 30 and 32 can be made of a suitable polymer, such as polypropylene. The hip restraints 30 and 32 can be formed using any one of a variety of suitable techniques, such as gas assist injection molding.

Figure 3:
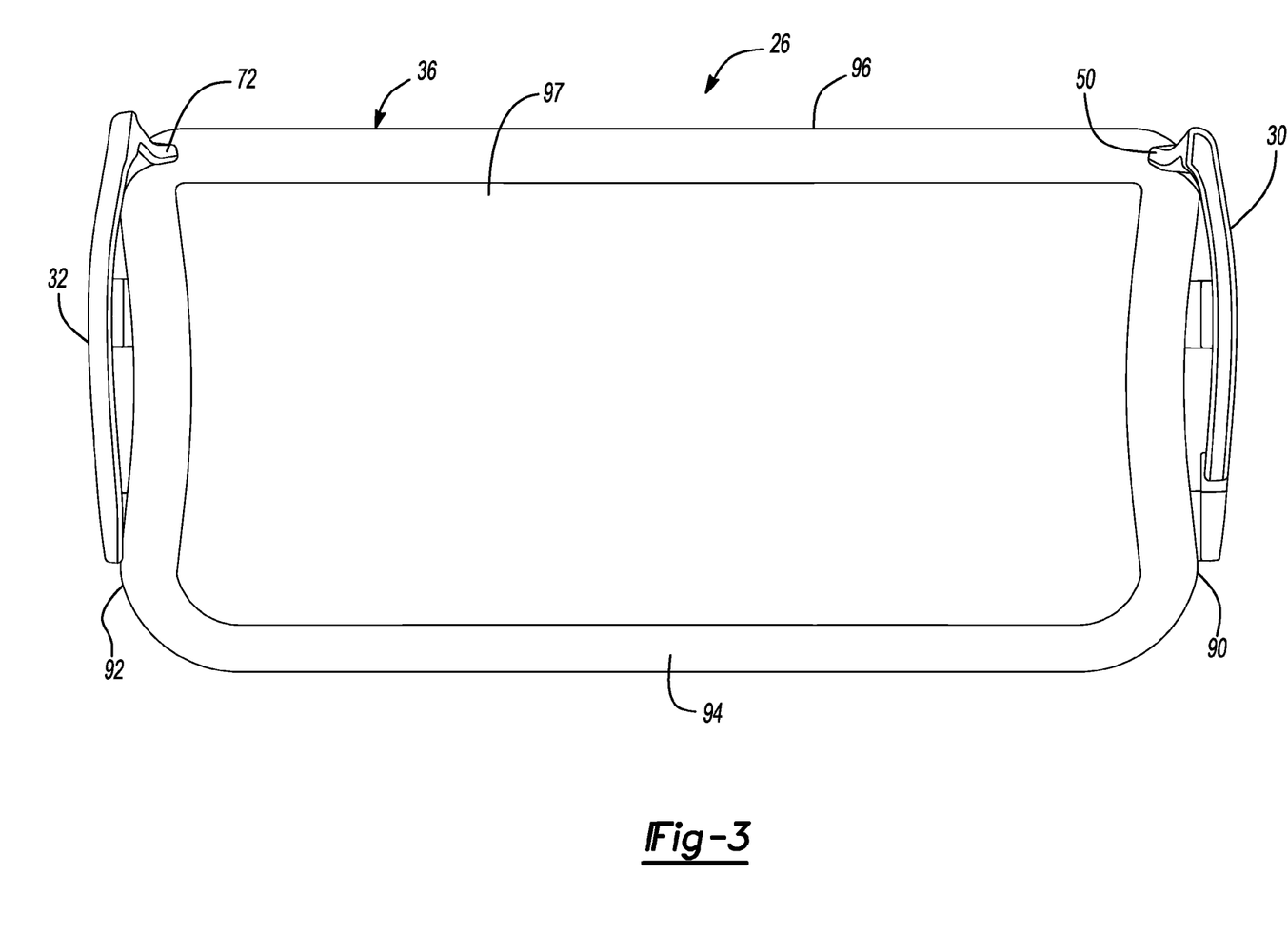
FIG. 3 is a top plan view of a front seat base assembly of the golf car of FIG. 1.
Figure 4:
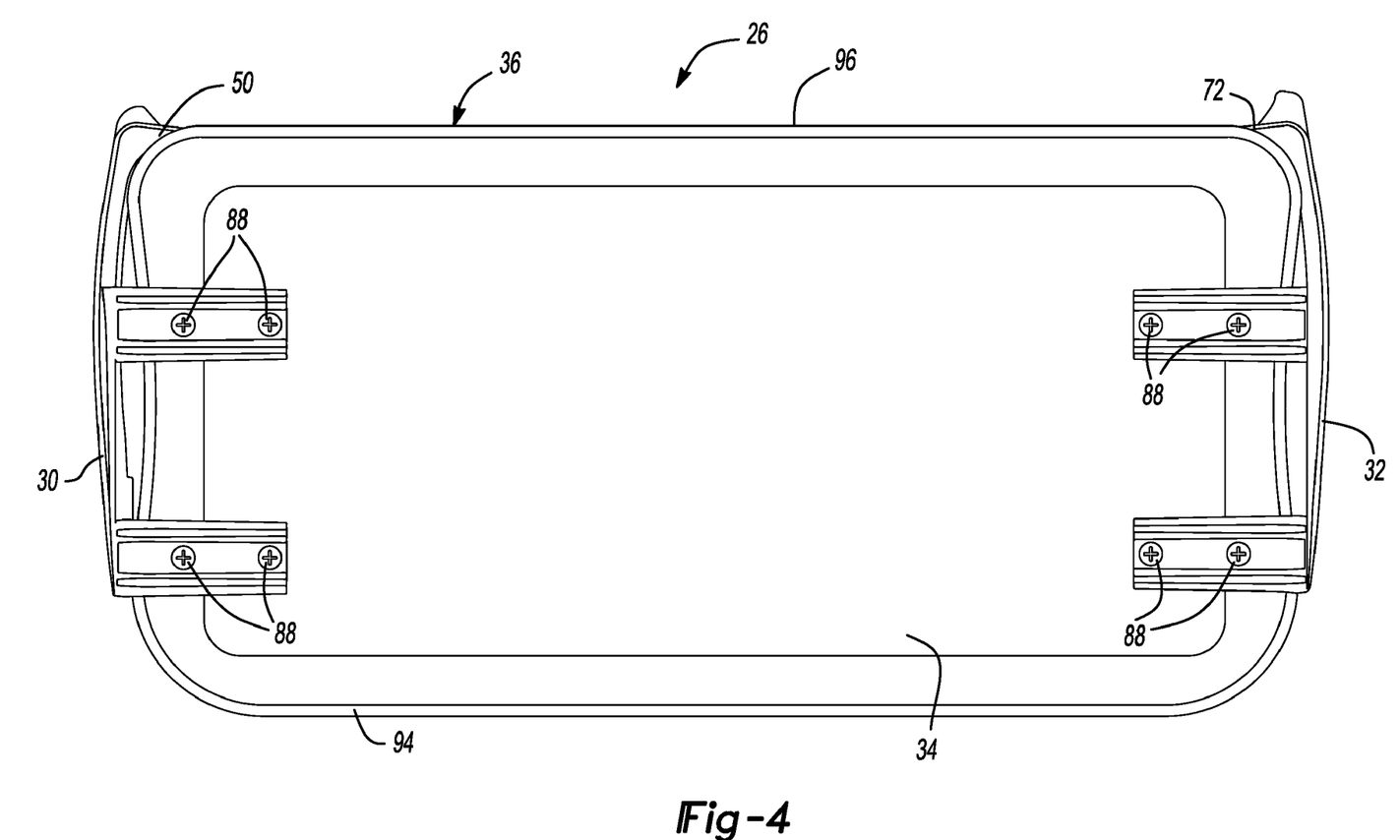
FIG. 4 is a bottom plan view of the front seat base assembly of FIG. 3.
Figure 9:
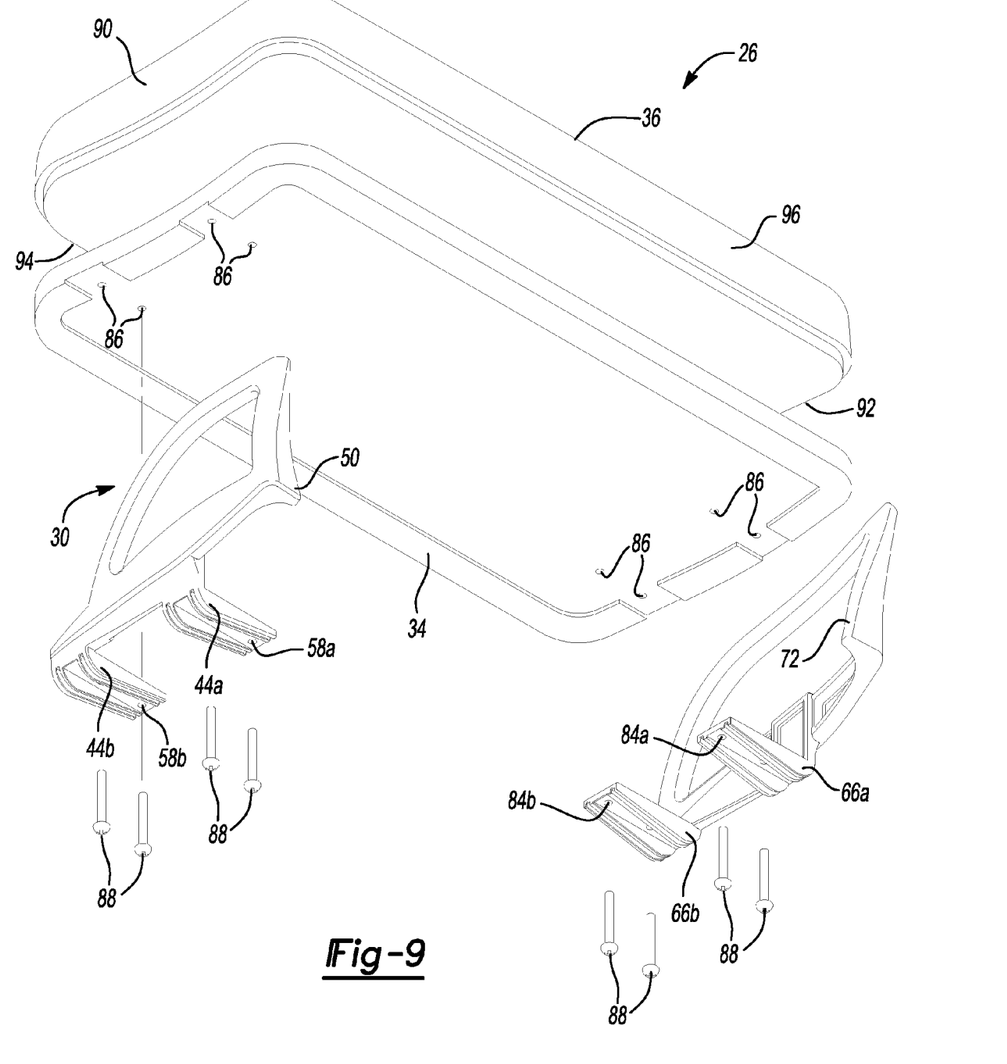
FIG. 9 is an exploded view of the seat base assembly of the golf car of FIG. 1.

With renewed reference to FIGS. 3 and 4 and additional reference to FIG. 9, the seat bottom 34 is generally planar. The seat bottom 34 can include a plurality of receptacles 86 (FIG. 9) at opposite ends of the seat bottom 34. The receptacles 86 can be operable to receive a suitable fastener, such as a fastener 88. The seat bottom 34 can be made of a variety of suitable materials, such as a suitable polymer.

The seat cushion 36 can generally include a first side 90, a second side 92 opposite the first side 90, a front end 94, a rear end 96 opposite the front end 94, and an upper surface 97. The seat cushion 36 can be a made of any suitable material operable to provide the operator and passenger of the golf car 10 with a soft surface to sit on. For example, the seat cushion 36 can be made of polyurethane foam. The seat cushion 36 can be mounted to the seat bottom 34 using any suitable fastening device or method. The seat cushion 36 can also be formed integral with the seat bottom 34.

As illustrated in FIG. 9, the hip restraints 30 and 32 can be mounted to the undersurface of the seat bottom 34. The hip restraints 30 and 32 can be mounted by threading the holes 58a and 58b of the driver side hip restraint 30 and the holes 84a and 84b of the passenger side hip restraint 32 with the fasteners 88 and securing the fasteners 88 within the receptacles 86 of the seat bottom 34. The driver side hip restraint 30 can be mounted such that it can be adjacent to the first side 90 of the cushion 36 and can extend to the rear end 96 of the cushion 36. The passenger side hip restraint 32 can be mounted such that it is adjacent to the second end 92 of the cushion 36 and can extend to the rear end 96 of the cushion 36.

The seat base assembly 26 (which can include the hip restraints 30 and 32, the seat cushion 36, and the seat bottom 34) can be secured to the body 12 of the golf car 10 using a suitable fastening device (not shown), such as a hinged fastening device. One half of the hinge can be mounted to the seat bottom 34 and the other half of the hinge can be mounted to the body 12. The use of a hinged fastening device permits the seat base assembly 26 to be rotated between a down or closed position and an up or open position. In the closed position the seat base assembly 26 obstructs access to components in the body 12 of the car 10 beneath the seat base assembly 26. In the open position the seat base assembly 26 does not obstruct access to components of the body 12 beneath the seat base assembly 26, thus permitting such components to be serviced. The hip restraints 30 and 32 are sized and shaped to allow occupants to easily ingress and egress the car 10, as well as provide maximum support to the occupants.

Figure 5:
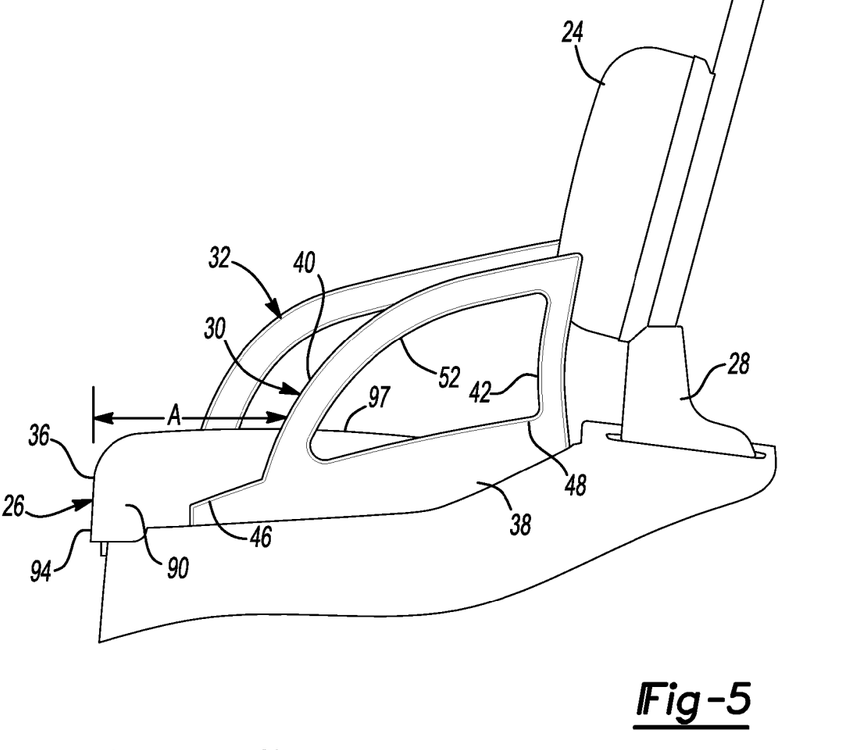
FIG. 5 is a side view of the driver's side of the golf car of FIG. 1.

As illustrated in FIG. 5, with respect to the driver side hip restraint 30 the distance A from the front 94 of the seat cushion 36 to the part of the arched portion 40 that is planar with the upper surface 97 of the cushion 36 can be from about 7.5 inches to about 8.5 inches, such as about 7.9 inches. At its highest point, the hip restraint 30 can extend above the cushion 36 to a height of from about 6 inches to about 7 inches, such as about 6.68 inches.

Figure 6:
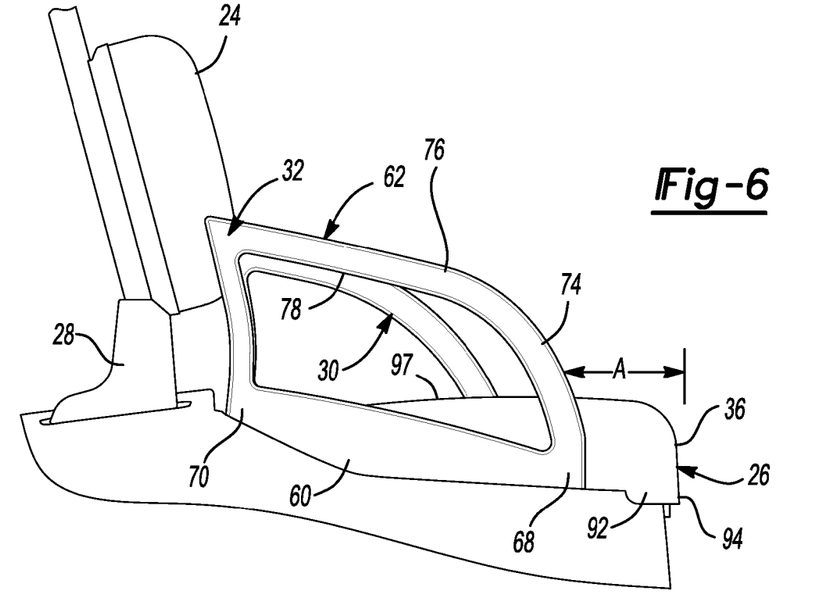
FIG. 6 is a side view of the passenger's side of the golf car of FIG. 1.
Figure 7A:
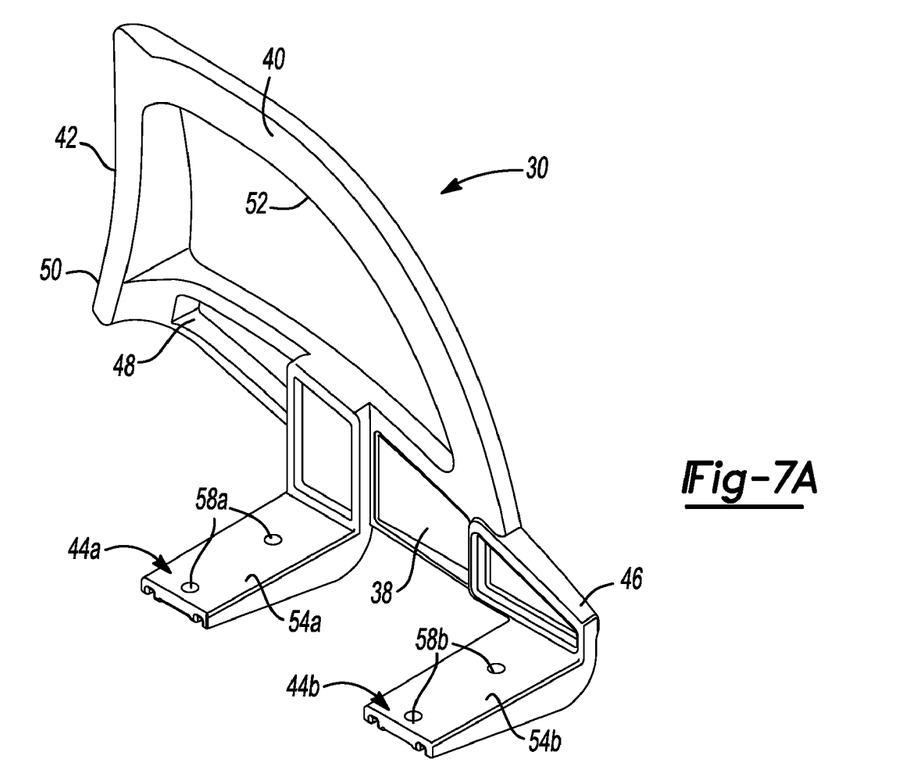
FIG. 7a is a first perspective view of the driver's side hip restraint of the golf car of FIG. 1.
Figure 7B:
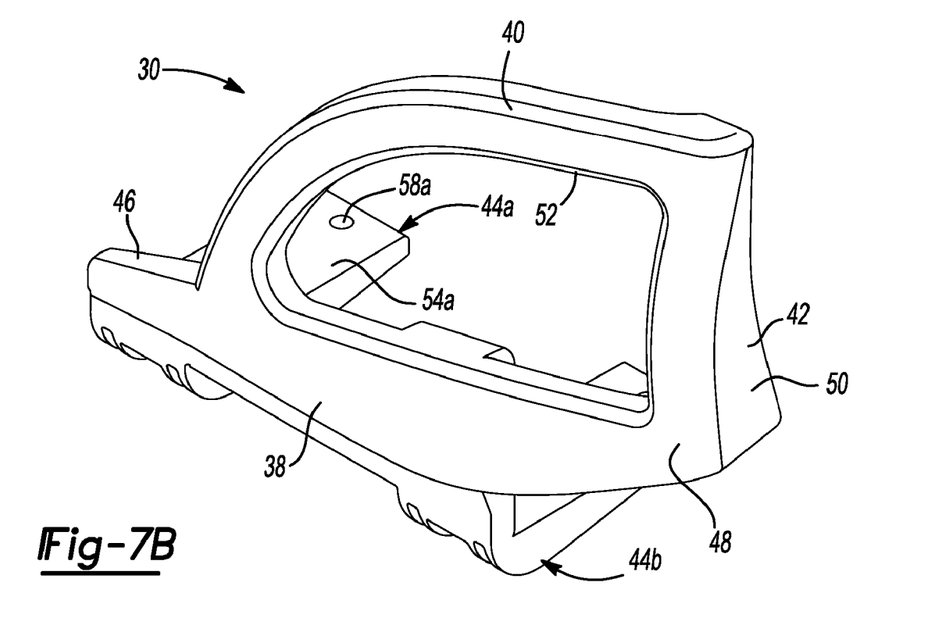
Figure 7C:
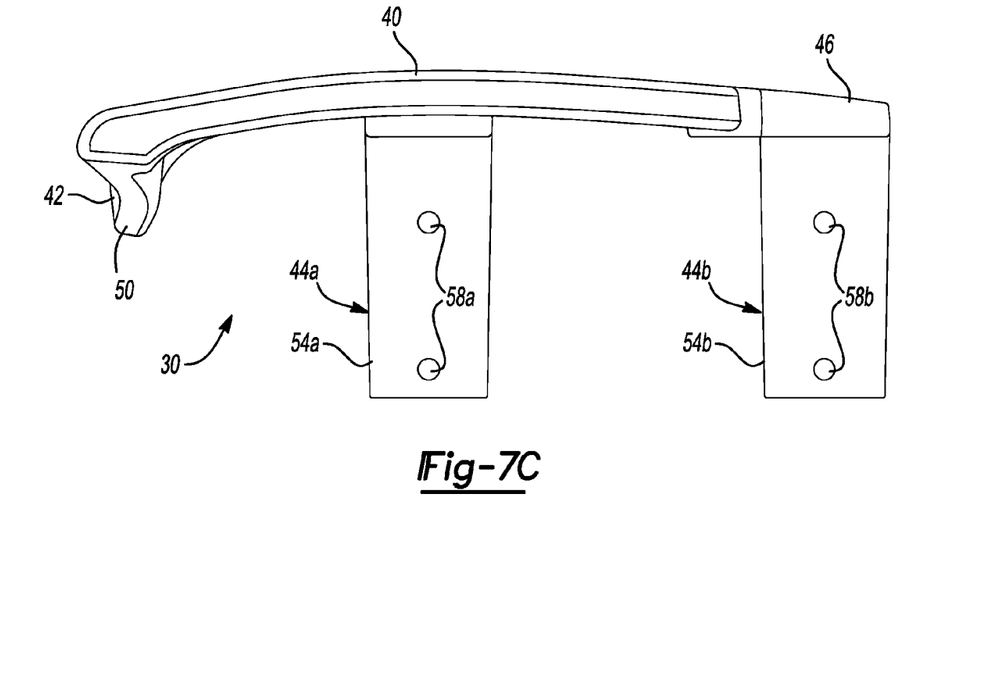
Figure 7D:
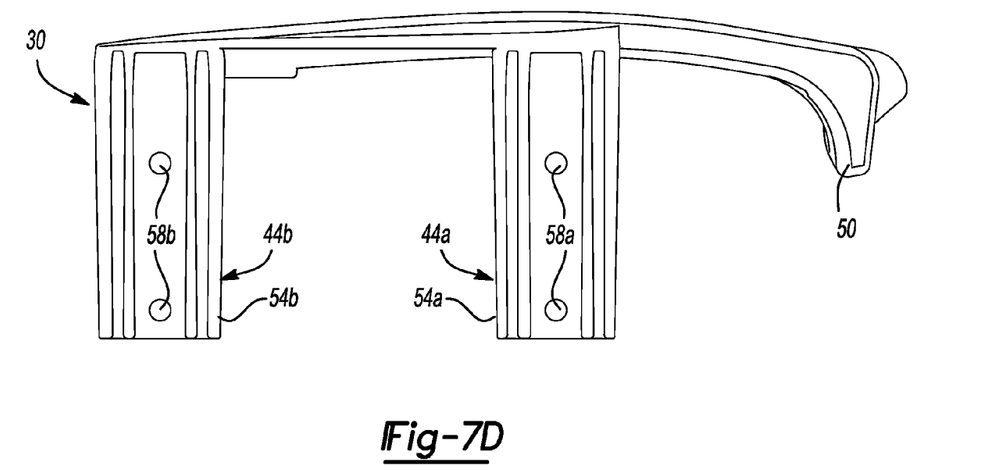
Figure 7E:
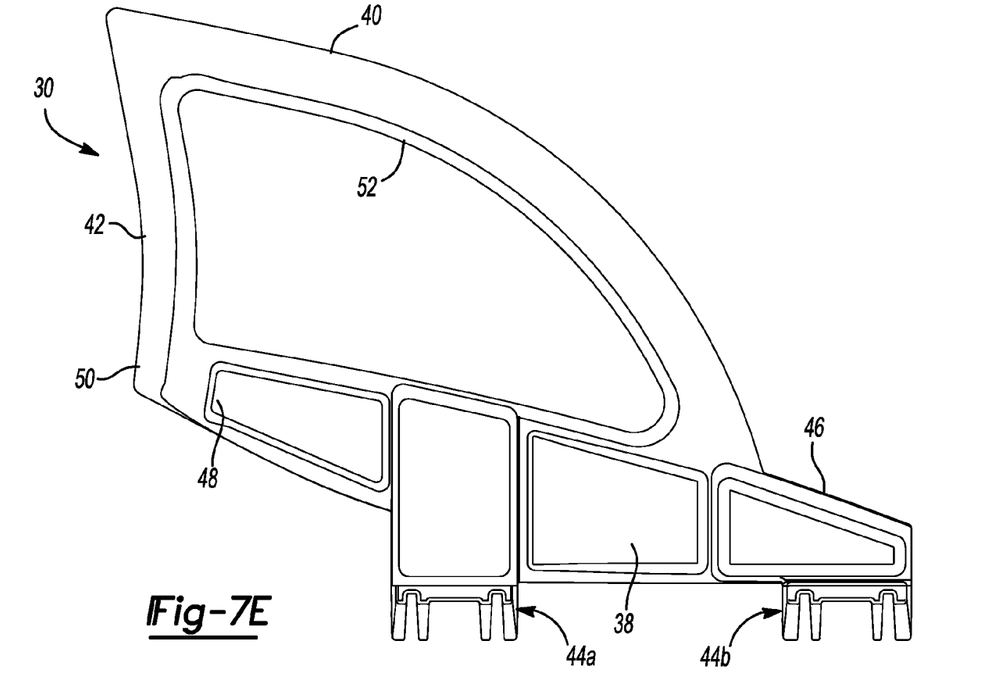
Figure 7F:
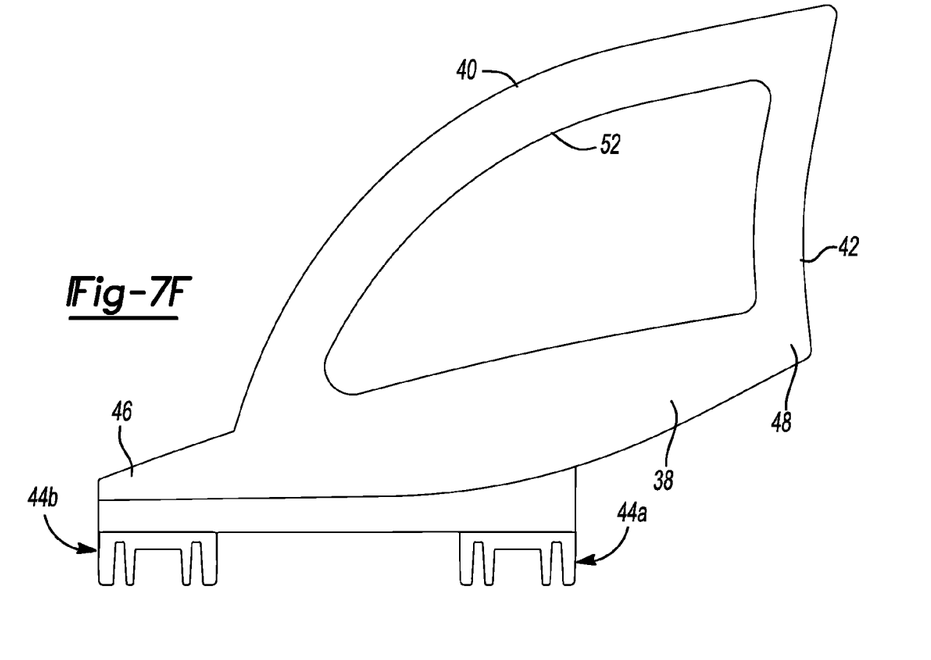
Figures 8A, 8B:
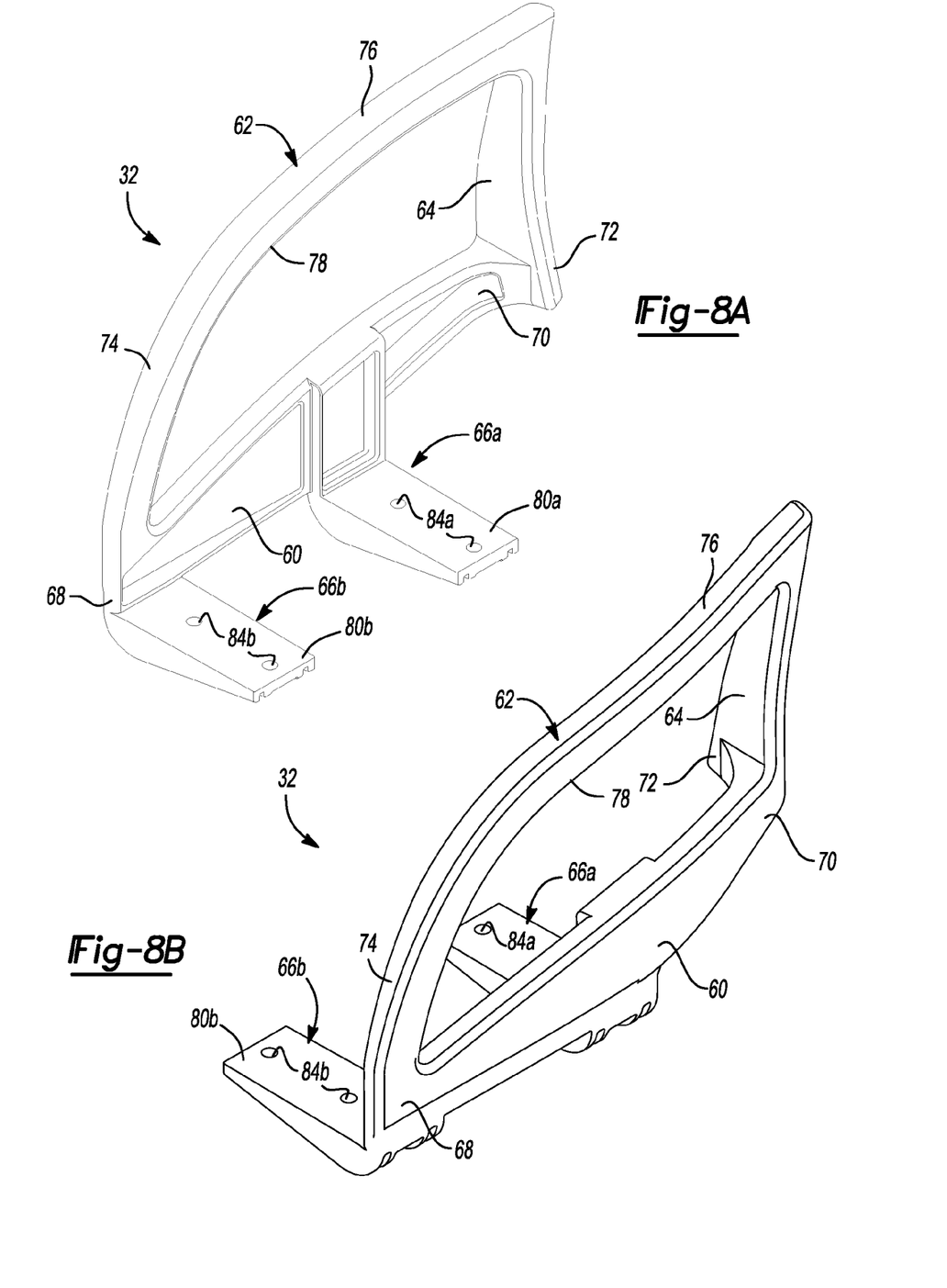
Figure 8C:
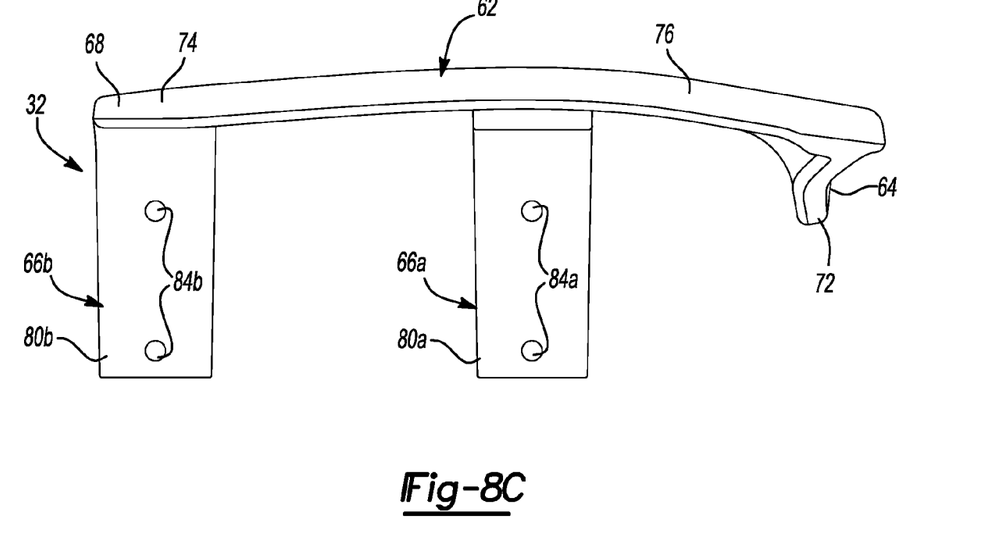
Figure 8D:
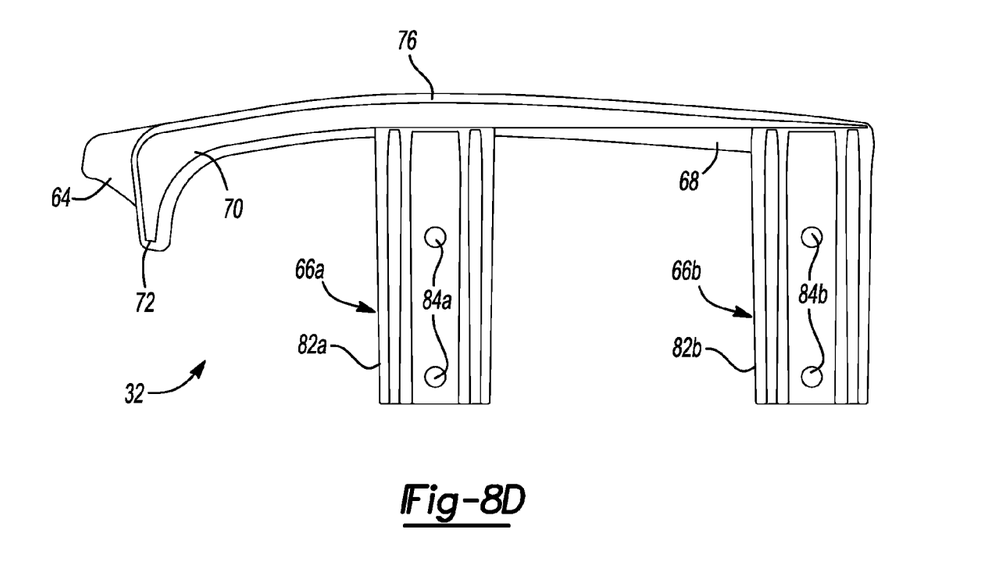
Figure 8E:
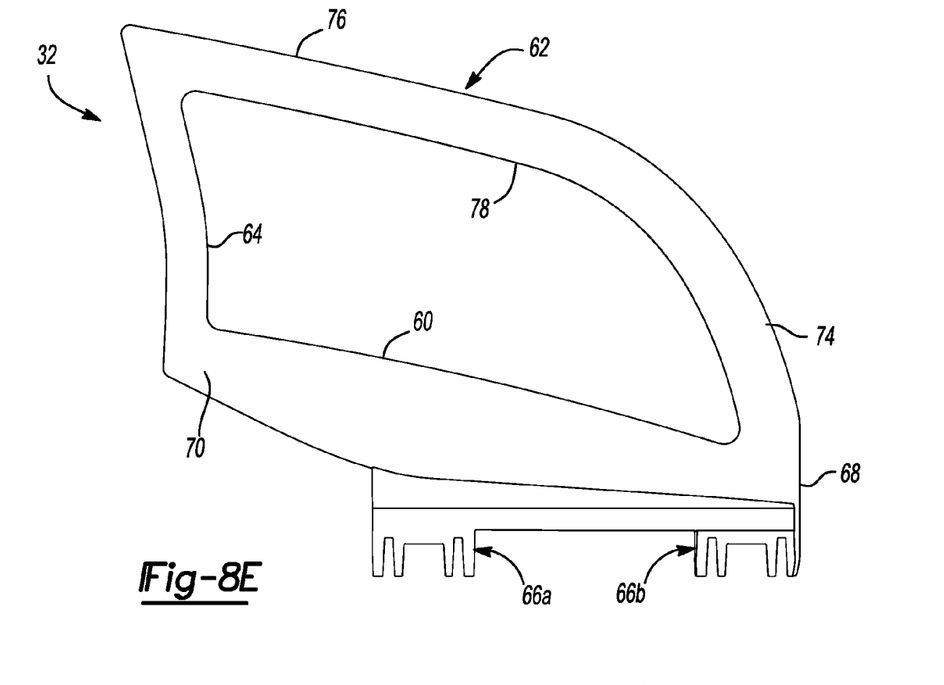
Figure 8F:
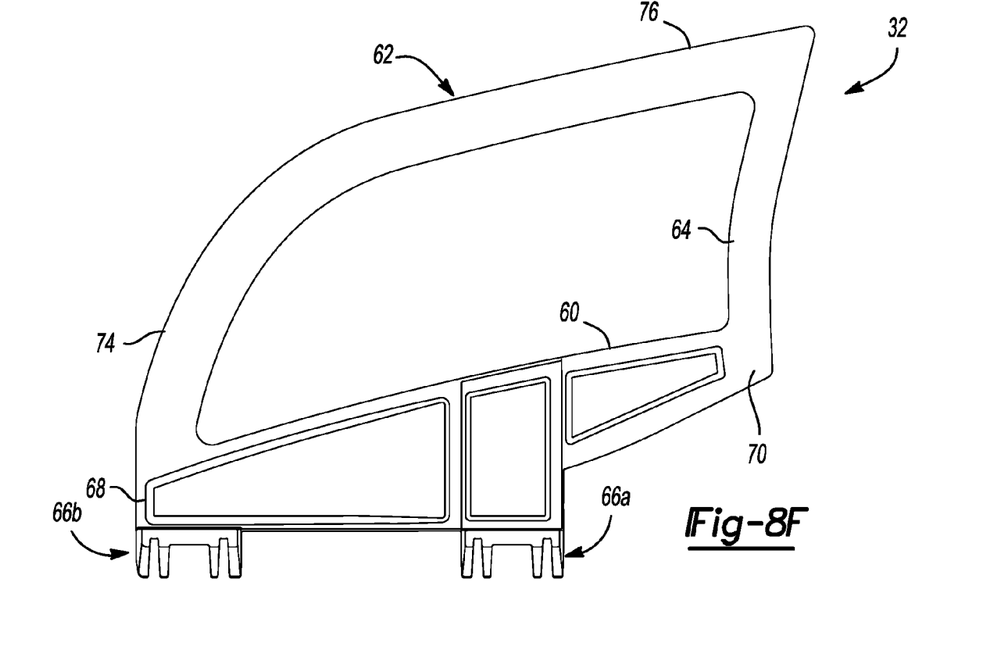

As illustrated in FIG. 6, with respect to the passenger side hip restraint 32 the distance A from the front 94 of the seat cushion 36 to the part of the arched portion 62 that is planar with the upper surface 97 of the cushion 36 can be from about 4 inches to about 5 inches, such as about 4.7 inches. At its highest point, the hip restraint 32 can extend above the cushion 36 to a height of from about 6.75 inches to about 7.75 inches, such as about 7.38 inches.

The dimensions of the hip restraints 30 and 32 can permit the occupants to easily ingress and egress the vehicle 10 and also provide proper support to the occupants. To further ease the driver's ability to egress and ingress the vehicle 10, the distance A that the driver side hip restraint 30 is offset from the front end 94 of the cushion 36 can be increased relative to the distance A that the passenger side hip restraint 32 is offset from the front end 94 of the cushion 36. Further, the height of the driver side hip restraint 30 can be lower than the height of the passenger side hip restraint 32. Increasing the distance A of the driver side hip restraint 30 and decreasing the height relative to the passenger side hip restraint 32 does not decrease the amount of support afforded the driver because the driver is able to support himself/herself using the steering wheel of the vehicle 10.

The flanges 50 and 72 can provide further support to occupants of the car 10. For example, as illustrated in FIGS. 3 and 4 the flanges 50 and 72 can overlap the upper surface 97 of the seat cushion 36. Thus, the flanges 50 and 72 can wrap around the backs of the driver and passenger respectively to provide additional lateral support to the occupants of the car 10.

The description herein is merely exemplary in nature and, thus, variations that do not depart from the gist of that which is described are intended to be within the scope of the disclosure. Such variations are not to be regarded as a departure from the spirit and scope of the disclosure.

What is claimed is:

1. A golf car comprising:
   a seat assembly having an upper surface, a lower surface opposite said upper surface, a front end, a rear end opposite said front end, a first side and a second side opposite said first side; and
   a first hip restraint mounted to said lower surface and extending to said first side, said first hip restraint comprising polypropylene;
   wherein said first hip restraint is gas assist injection molded; and
   wherein said first hip restraint comprises a first flange that overlaps said upper surface of said seat.

2. The golf car of claim 1, further comprising a second hip restraint comprising polypropylene that is mounted to said lower surface and extends to said second side;
   wherein said second hip restraint is gas assist injection molded.

3. The golf car of claim 2, wherein said second hip restraint further comprises a second arched portion that at a point planar with said upper surface of said seat is from about 4 inches to about 5 inches from said front end of said seat.

4. The golf car of claim 2, wherein said second hip restraint extends from about 6.75 inches to about 7.75 inches above said upper surface of said seat.

5. The golf car of claim 2, wherein said first hip restraint extends further above said upper surface of said seat than said second hip restraint.

6. The golf car of claim 2, wherein said first hip restraint further comprises a first arched portion and said second hip restraint further comprises a second arched portion, said first arched portion is recessed a greater distance from said front end of said seat than said second arched portion.

7. The golf car of claim 1, wherein said first hip restraint comprises a first end and a second end that is opposite said first end, said first end is offset from said front end of said seat and said second end extends to said rear end of said seat.

8. The golf car of claim 1, further comprising a second hip restraint mounted to said lower surface of said seat assembly and extending to said second side of said seat assembly, said second hip restraint comprising a second flange that overlaps said upper surface of said seat.

9. The golf car of claim 1, wherein said first hip restraint comprises a base portion that is offset from said seat, said base portion is orientated about 90° relative to said first flange.

10. The golf car of claim 1, wherein said first hip restraint further comprises a first arched portion that at a point planar with said upper surface of said seat is from about 7.5 inches to about 8.5 inches from said front end of said seat.

11. The golf car of claim 1 wherein said first hip restraint extends from about 6 inches to about 7 inches above said upper surface of said seat.

12. A hip restraint for a golf car comprising:
    a base portion;
    a post extending from said base portion;
    an arched portion extending between said base portion and said post;
    an aperture defined by said base portion, said post, and said arched portion; and
    a flange extending from said post;
    wherein said base portion comprises a front end and a rear end, said arched portion extends from said base portion to said post from a point offset from said front end.

13. A golf car comprising:
    a seat base assembly having an upper surface, a lower surface opposite said upper surface, a front end, a rear end opposite said front end, a first side between said front end and said rear end, and a second side between said front end and said rear end;
    a first hip restraint mounted at said first side;
    a second hip restraint mounted at said second side;
    a first flange extending from said first hip restraint and overlapping said upper surface of said seat base; and
    a second flange extending from said second hip restraint and overlapping said upper surface of said seat base.

14. The golf car of claim 13, wherein said first flange and said second flange comprise polypropylene.

15. The golf car of claim 14, wherein said first flange and said second flange are gas assist injection molded.

16. The golf car of claim 13, wherein said first hip restraint comprises a mounting flange that is mounted to an undersurface of said seat base assembly;
    wherein said mounting flange comprises a planar surface that is in contact with said undersurface of said seat base assembly.

* * * * *